United States Patent [19]
Ternullo, Jr. et al.

[11] Patent Number: 6,016,072
[45] Date of Patent: Jan. 18, 2000

[54] REGULATOR SYSTEM FOR AN ON-CHIP SUPPLY VOLTAGE GENERATOR

[75] Inventors: Luigi Ternullo, Jr.; Michael C. Stephens, both of San Jose, Calif.

[73] Assignee: Vanguard International Semiconductor Corporation, Taiwan

[21] Appl. No.: 09/046,408

[22] Filed: Mar. 23, 1998

[51] Int. Cl.[7] .................................................. G05F 1/10
[52] U.S. Cl. ........................... 327/535; 327/62; 323/284
[58] Field of Search ................................... 327/535, 536, 327/537, 143, 198, 534, 62; 323/282, 284; 365/189.09

[56] References Cited

U.S. PATENT DOCUMENTS

| | | | |
|---|---|---|---|
| 5,034,625 | 7/1991 | Min et al. ................................. | 327/536 |
| 5,341,035 | 8/1994 | Shibayama et al. ..................... | 327/543 |
| 5,506,540 | 4/1996 | Sakurai et al. ........................... | 327/535 |
| 5,530,640 | 6/1996 | Hara et al. ................................ | 327/534 |
| 5,602,506 | 2/1997 | Kim et al. ................................. | 327/535 |
| 5,744,998 | 4/1998 | Ito et al. ................................... | 327/537 |
| 5,874,851 | 2/1999 | Shiota ...................................... | 327/534 |

*Primary Examiner*—Timothy P. Callahan
*Assistant Examiner*—Terry L. Englund
*Attorney, Agent, or Firm*—Christensen O'Connor Johnson & Kindness PLLC

[57] ABSTRACT

A regulator system includes first and second voltage sensing circuits coupled to a voltage generator control circuit. The first and second voltage sensing circuits are configured to monitor the voltage generated by the on-chip voltage generator (i.e., the on-chip supply voltage) and detect when the on-chip supply voltage reaches thresholds that are predetermined to define a desired range of the on-chip supply voltage. The voltage generator control circuit receives voltage sense signals from the voltage sense circuits and, in response, asserts or de-asserts a control signal received by the on-chip voltage generator so as to activate or de-activate the on-chip voltage generator to maintain the on-chip supply voltage within the desired range. The voltage generator control circuit introduces hysteresis in the generation of the control signal provided to the on-chip voltage generator. As a result of this hysteresis, once the on-chip voltage generator is activated, the voltage generator control circuit only de-activates the on-chip voltage generator when the on-chip supply voltage reaches the higher threshold. Conversely, once the on-chip voltage generator is de-activated, the voltage generator control circuit only activates the on-chip voltage generator when the on-chip supply voltage reaches the lower threshold.

29 Claims, 4 Drawing Sheets

6,016,072

1

REGULATOR SYSTEM FOR AN ON-CHIP SUPPLY VOLTAGE GENERATOR

FIELD OF THE INVENTION

The present invention relates to voltage regulator circuits and, more particularly, to regulator circuits for on-chip supply voltage generators.

BACKGROUND

Some integrated circuits (i.e., chips) have an on-chip voltage generator for supplying a voltage different from the voltage supplied to the chip from on off-chip supply. This type of voltage generator is referred to herein as an on-chip supply voltage generator. One typical application for an on-chip supply voltage generator is for generating a negative voltage to back-bias a ptype substrate of a chip to control the threshold voltage of n-channel field effect transistor devices in the chip. FIG. 1 is a simplified functional block diagram illustrative of a conventional back-bias charge pump circuit 10.

Circuit 10 includes a voltage sensing circuit (VSC) 11 and a charge pump 13. VSC 11 is connected to receive the off-chip supply voltage Vdd through a connection 15 and the back-bias voltage Vbb through a connection 16. VSC 11 is configured to generate a control signal Vok, which is received by charge pump 13. More specifically, VSC 11 asserts signal Vok when the value of voltage Vbb reaches a predetermined threshold value, which causes charge pump 13 to stop pumping charge from the substrate through a connection 17.

FIG. 2 is a diagram illustrative of the back-bias voltage generated by back-bias charge pump circuit 10 (FIG. 1). Referring to FIGS. 1 and 2, VSC 11 detects when voltage Vbb generated by charge pump 13 reaches the predetermined value Vmax. When the value of voltage Vbb is below value Vmax (in magnitude in this embodiment because voltage Vbb is maintained at a negative value relative to a ground bus), VSC 11 de-asserts control signal Vok, causing charge pump 13 to operate, thereby increasing the magnitude of voltage Vbb. When the magnitude of voltage Vbb reaches value Vmax, VSC 11 asserts control signal Vok, causing charge pump 13 to stop operating. The value of voltage Vbb then begins to drop. When the value of voltage Vbb drops below the value Vmax, VSC 11 de-asserts control signal Vok, thereby again activating charge pump 13.

This single trip point scheme results in voltage Vbb hovering around voltage Vmax, as indicated by waveform 21 in FIG. 2. It is observed that in this scheme, VSC 11 repeatedly activates and deactivates charge pump 13 with a relatively high frequency. This repeated unnecessary activation and deactivation of charge pump 13 tends to dissipate a relatively large amount of power. In addition, the repeated activation and deactivation of charge pump 13 tends to increase noise in the voltage Vbb. Accordingly, there is a need for a regulator system for on-chip voltage generators with decreased power dissipation and noise generation.

SUMMARY

In accordance with the present invention, a regulator system for an on-chip voltage generator is provided. In one aspect of the present invention, the regulator system includes first and second voltage sensing circuits coupled to a voltage generator control circuit. The first and second voltage sensing circuits are configured to monitor the voltage generated by the on-chip voltage generator (i.e., the on-chip supply voltage) and detect occurrences of the on-chip supply voltage reaching predetermined thresholds. More specifically, these thresholds are predetermined to define a desired range of the on-chip supply voltage. The voltage generator control circuit receives voltage sense signals from the voltage sense circuits and, in response, asserts or de-asserts a control signal received by the on-chip voltage generator so as to activate or de-activate the on-chip voltage generator to maintain the on-chip supply voltage within the desired range. This system reduces the rate at which the on-chip voltage generator is activated and de-activated, thereby reducing power dissipation and noise.

In a further aspect of the present invention, the voltage generator control circuit introduces hysteresis in the generation of the control signal provided to the on-chip voltage generator. As a result of this hysteresis, once the on-chip voltage generator is activated, the voltage generator control circuit only de-activates the on-chip voltage generator when the on-chip supply voltage reaches the higher threshold (for on-chip supply voltages that are negative, "higher" refers to the more negative threshold). Conversely, once the on-chip voltage generator is de-activated, the voltage generator control circuit only activates the on-chip voltage generator when the on-chip supply voltage reaches the lower threshold (for on-chip supply voltages that are negative, "lower" refers to the less negative threshold).

In yet another aspect of the present invention, a third voltage sense circuit is used to detect if the on-chip supply voltage exceeds a maximum threshold (for on-chip supply voltages that are negative, "maximum" refers the most negative threshold). If the on-chip supply voltage reaches this maximum threshold, the voltage generator control circuit is configured to quickly force the control signal to the logic level that de-activates the on-chip voltage generator. A further refinement of this aspect of the present invention is adapted for chips that use a stand-by voltage generator that is normally activated while the chip is powered. In this refinement, the voltage generator control circuit also de-activates the stand-by voltage generator when the on-chip supply voltage reaches the maximum threshold.

DETAILED DESCRIPTION

Figure 1:
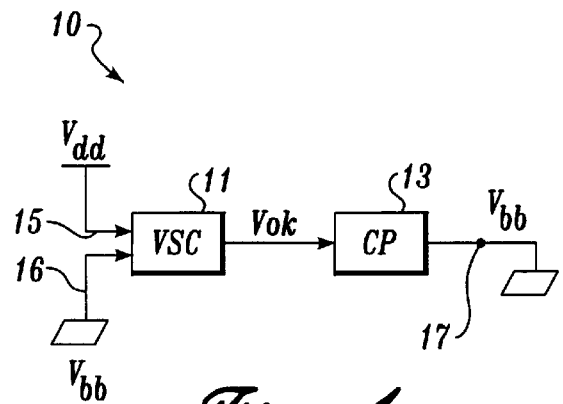
FIG. 1 is a simplified functional block diagram illustrative of a conventional back-bias charge pump circuit.
Figure 2:
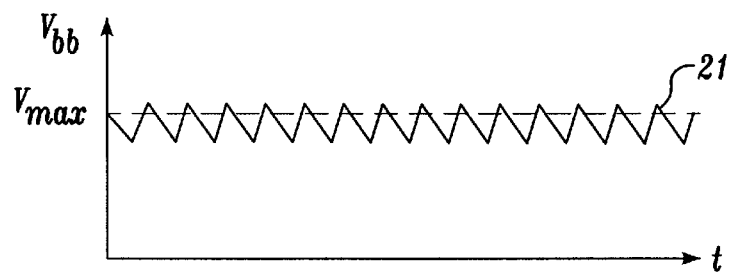
FIG. 2 is a diagram illustrative of the back bias voltage generated by a typical conventional back-bias charge pump circuit.
Figure 3:
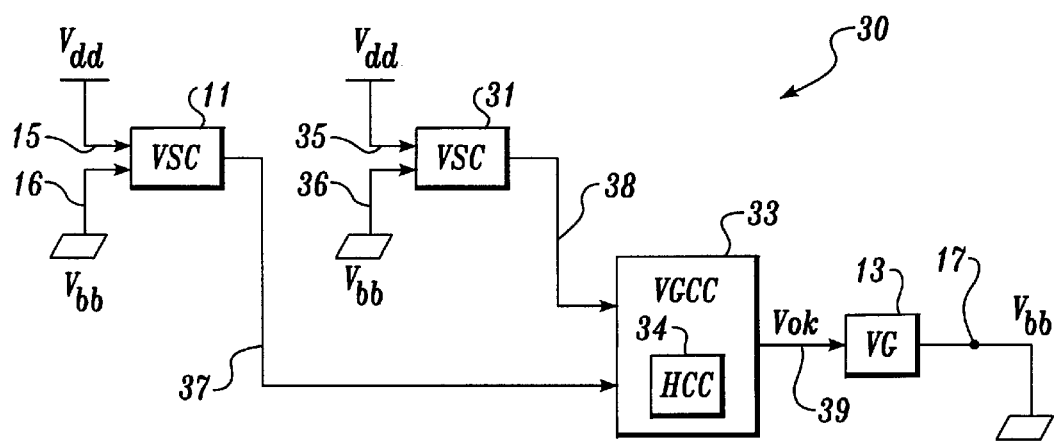
FIG. 3 is a functional block diagram illustrative of a regulator system for an on-chip voltage generator, according to one embodiment of the present invention.

FIG. 3 is a functional block diagram illustrative of a regulator system 30 for an on-chip voltage generator, according to one embodiment of the present invention. System 30 is similar to system 10 except that system 30 includes a VSC 31 and a voltage generator control circuit (VGCC) 33, as well as VSC 11 and voltage generator 13. The same reference numbers are used between drawings for elements having similar function or structure. In this embodiment, voltage generator 13 is a conventional charge pump.

System 30 is interconnected as follows. VSC 31 is connected to receive off-chip supply voltage Vdd and on-chip supply voltage Vbb through connections 35 and 36, respectively. In addition, VSC 11 and VSC 31 are connected to provide voltage sense signals to VGCC 33 via connections 37 and 38, respectively. VGCC 33 is connected to provide control signal Vok to voltage generator 13 through a connection 39.

In this embodiment, VSC 11 and VSC 31 are conventional voltage sensing circuits that detect occurrences of on-chip supply voltage Vbb exceeding a predetermined threshold voltage. In particular, VSC 11 is configured to detect occurrences of on-chip supply voltage Vbb exceeding (in magnitude) −1.3 volts, and VSC 31 is configured to detect occurrences of the on-chip supply voltage Vbb exceeding (in magnitude) −1.5 volts. More specifically, each VSC is configured to generate a voltage sense signal, which the VSC asserts when on-chip supply voltage Vbb is greater in magnitude than the predetermined threshold and de-asserts when the on-chip supply voltage Vbb is lower in magnitude than the predetermined threshold.

In response to the voltage sense signals received from VSC 31 and VSC 11, VGCC 33 generates control signal Vok that is received by voltage generator 13. VGCC 33 includes a hysteresis control circuit (HCC) 34 that introduces hysteresis in the generation of control signal Vok. More specifically, VGCC 33 is configured to de-assert control signal Vok when the voltage sense signals provided by VSC 11 and VSC 31 both are de-asserted (i.e., thereby indicating that the on-chip supply voltage Vbb is below −1.3 volts). It is appreciated by those skilled in the art of on-chip voltage generators that because on-chip supply voltage Vbb is a negative voltage in this embodiment, the term "below" in this context refers to values that are less negative than −1.3 volts. In response to the de-asserted control signal Vok, voltage generator 13 operates to cause on-chip supply voltage Vbb to be more negative.

When on-chip supply voltage Vbb increases (negatively, in this embodiment) to −1.3 volts, VSC 11 asserts the voltage sense signal on connection 37, which is then received by VGCC 33. However, HCC 34 of VGCC 33 introduces hysteresis in the operation of VGCC 33 whereby VGCC 33 continues de-asserting control signal Vok. Then when on-chip supply voltage Vbb increases (negatively) to −1.5 volts, VSC 31 asserts the voltage sense signal on connection 38 and received by VGCC 33. In response to both voltage sense signals being asserted, VGCC 33 asserts control signal Vok, thereby de-activating voltage generator 13 to stop driving on-chip supply voltage Vbb to be more negative.

After voltage generator 13 is de-activated, on-chip supply voltage Vbb generally begins to decrease (i.e., become less negative). When on-chip supply voltage Vbb drops below −1.5 volts, VSC 31 de-asserts the voltage sense signal on connection 38. However, the hysteresis control provided by HCC 34 causes VGCC 33 to continue to assert control signal Vok. When on-chip supply voltage Vbb drops (in magnitude) below −1.3 volts, VSC 11 de-asserts the voltage sense signal on connection 37. In response to the de-asserted voltage sense signals on connections 37 and 38, VGCC 33 de-asserts control signal Vok, thereby activating voltage generator 13 to drive on-chip supply voltage Vbb to be more negative, The regulation of on-chip voltage Vbb is illustrated in FIG. 4.

Figure 4:
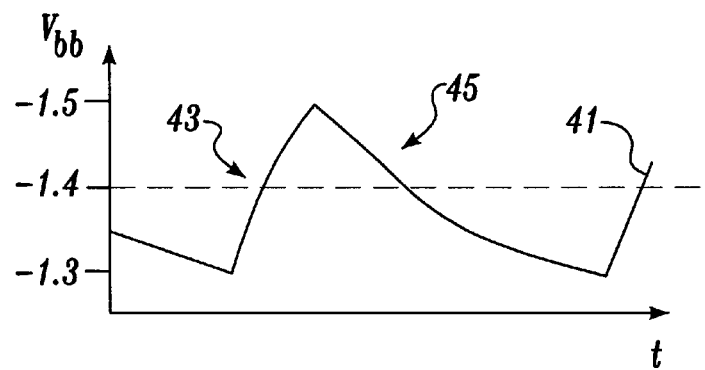
FIG. 4 is a diagram illustrative of the regulated voltage generated by the regulator system of FIG. 3.

Referring to FIGS. 3 and 4, the voltage level of on-chip supply voltage Vbb ranges from about −1.3 to −1.5 volts as indicated by a waveform 41. When voltage generator 13 is activated, on-chip supply voltage Vbb increases, as indicated by portion 43 of waveform 41. When voltage generator 13 is de-activated, the on-chip voltage supply begins to decay, as indicated by a portion 45 of waveform 41. Typically, the rates of increasing and decreasing the on-chip supply voltage Vbb varies, depending on the operational mode of the chip and other factors. The relatively large range of on-chip supply voltage Vbb in system 30 advantageously allows the time period between activations of voltage generator 13 to increase. This reduction in the number of voltage generator activations per unit time reduces the power dissipation and noise generation resulting from voltage generator 13 being activated and de-activated.

Figure 5:
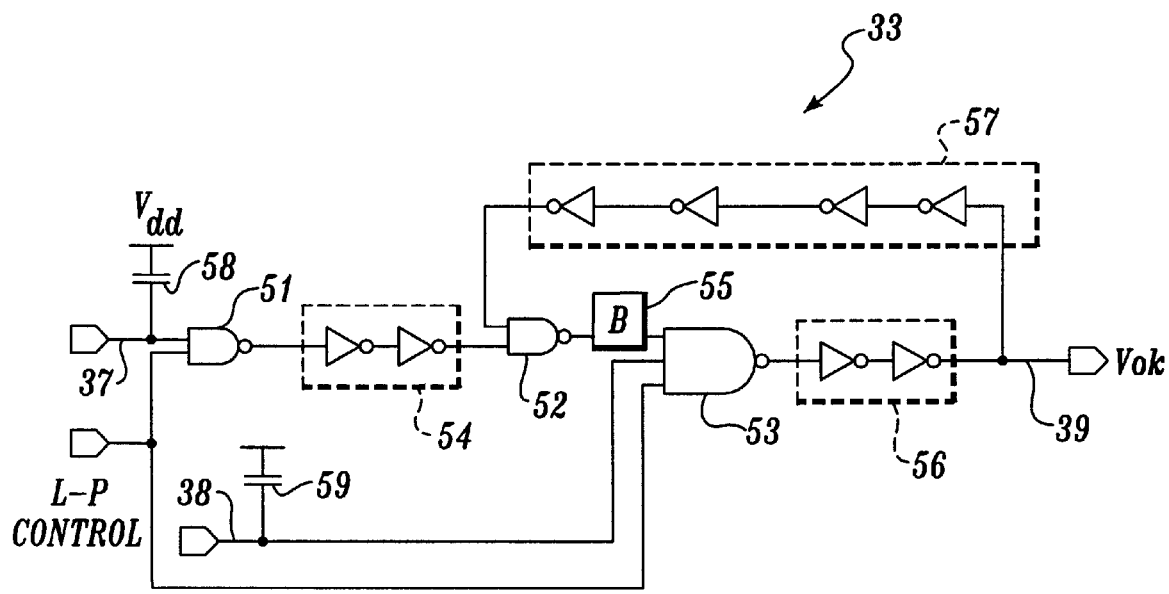
FIG. 5 is a schematic diagram illustrative of an implementation of the voltage generator control circuit of FIG. 3, according to one embodiment of the present invention.

FIG. 5 is a schematic diagram illustrative of an implementation of VGCC 33 (FIG. 3), according to one embodiment of the present invention. In this embodiment, VGCC 33 includes NAND gates 51–53, buffer circuits 54–57 and capacitors 58–59. Capacitors 58–59 are each implemented with a p-channel field effect transistor having its source and drain electrically connected to serve as one electrode and the gate serving as another electrode. In this embodiment, buffer circuits 54–56 are each implemented with two cascaded inverters, whereas buffer circuit 57 is implemented with four cascaded inverters to achieve a relatively longer delay than the delay through buffer circuits 54–56.

VGCC 33 is interconnected as follows. Two-input NAND gate 51 has one input lead connected to one electrode of capacitor 58 and also to connection 37 to receive the voltage sense signal generated by VSC 11 (FIG. 3). The other input lead of NAND gate 51 is also connected to receive a low-power mode control signal from a control circuit (not shown). The low-power mode control signal is used to place the chip into a low-power mode to conserve power. The other electrode of capacitor 58 is connected to the off-chip voltage supply (not shown).

The output lead of NAND gate 51 is connected to an input lead of buffer circuit 54. The output lead of buffer circuit 54 is connected to one input lead of two-input NAND gate 52. The other input lead of NAND gate 52 is connected to the output lead of buffer circuit 57, whereas the output lead of NAND gate 52 is connected to the input lead of buffer circuit 55. The output lead of buffer circuit 55 is connected to an input lead of three-input NAND gate 53. A second input lead of NAND gate 53 is connected to receive the low-power mode control signal. The other input lead of NAND gate 53 is connected to one electrode of capacitor 59 and also to connection 38 to receive the voltage sense signal generated by VSC 31 (FIG. 3). The other electrode of capacitor 59 is connected to the off-chip voltage supply (not shown). The output lead of NAND gate 53 is connected to an input lead of buffer circuit 56. The output lead of buffer circuit 56 is connected to connection 39 and to the input lead of buffer circuit 57.

This embodiment of VGCC 33 operates as follows. Capacitors 58 and 59 serve to add stability to transitions of the voltage sense signals generated by VSC 31 and VSC 11 (FIG. 3) and to help ensure that voltages at connections 37 and 38 initialize at logic high levels. During power-up, the on-chip supply voltage Vbb is typically about zero volts and, thus, VSCs 11 and 31 (FIG. 3) operate to cause the voltages at connections 38 and 37 to be at a logic high level. Consequently, when VGCC 33 is initialized and the low-power control signal is at a logic high level, NAND gates 51 and 53 generate logic low output signals. It will be appreciated that NAND gate 51 can be replaced with an inverter in embodiments that do not utilize a low-power mode control signal to enter a low-power mode. The logic low output signal generated by NAND gate 51 is received by buffer circuit 54, which propagates the logic low level signal to NAND gate 52. The buffering is generally used to provide good output signals to drive downstream circuitry. In response to the logic low level signal from buffer circuit 54, NAND gate 52 generates a logic high level output signal. This logic high output signal is received by buffer circuit 55.

NAND gate 53 receives the logic high output signal from buffer circuit 55 and a logic high voltage sense signal from VSC 31 (FIG. 3) through connection 38. As a result, NAND gate 53 generates a low level signal that is received by buffer circuit 56, which is propagated by buffer circuit 56 to connection 39 as control signal Vok. The logic low level of control signal Vok then propagates through buffer circuit 57 to one of the input leads of NAND gate 52. Thus, NAND gate 52 receives two logic low signals, thereby maintaining the output signal of NAND gate 52 at a logic high level. As described above, the logic low level of control signal Vok activates voltage generator 13 (FIG. 3) to drive on-chip supply voltage Vbb to be more negative.

When on-chip supply voltage Vbb negatively increases to the threshold voltage of VSC 11 (i.e., about −1.3 volts), VSC 11 (FIG. 3) asserts the voltage sense signal at connection 37. In this embodiment, the voltage sense signal is active-low and, thus, is at a logic low level when asserted. The logic low level of the voltage sense signal at connection 37 causes NAND gate 51 to generate logic high level output signal, which is then propagated by buffer circuit 54 to NAND gate 52. Due to the logic low level of control signal Vok (and propagated by buffer circuit 57), the logic high level signal from buffer circuit 54 does not cause NAND gate 52 to change the logic low level of its output signal. Thus, control signal Vok remains at a logic low level, causing voltage generator 13 (FIG. 3) to continue to drive on-chip supply voltage Vbb to be more negative.

Control signal Vok remains at a logic low level as on-chip supply voltage negatively increases between the threshold voltages of VSCs 11 and 31. However, as on-chip supply voltage Vbb negatively increases to the threshold voltage of VSC 31 (about −1.5 volts, in this embodiment), VSC 31 (FIG. 3) asserts the active low voltage sense signal at connection 38. The logic low level of the voltage sense signal causes NAND gate 53 to generate a logic high output signal, which is propagated through buffer circuit 56. After the delay provided by buffer circuit 56, control signal Vok transitions to a logic high level, thereby de-activating voltage generator 13 (FIG. 3). In addition, the logic high level of control signal Vok is propagated through buffer circuit 57 to NAND gate 52. Thus, both input leads of NAND gate 52 receive logic high level signals, thereby causing NAND gate 52 to generate a logic low output signal. Consequently, both input signals to NAND gate 53 are at logic low levels. Thus, NAND gate 53 continues to generate a logic high output signal, leaving unchanged the logic high level of control signal Vok so that voltage generator 13 (FIG. 3) remains de-activated.

After voltage generator 13 (FIG. 3) is de-activated, on-chip supply voltage Vbb typically begins to decay (i.e., becomes less negative, in this embodiment). When on-chip supply voltage Vbb negatively decreases below the threshold voltage (about −1.5 volts) of VSC 31 (FIG. 3), VSC 31 de-asserts the voltage sense signal at connection 38, which is received by NAND gate 53. However, NAND gate 53 continues to generate a logic high output signal because of the logic low level signal received from NAND gate 52. Consequently, voltage generator 13 (FIG. 3) remains de-activated.

As on-chip supply voltage Vbb negatively decreases between the threshold voltages of VSCs 31 and 11 (FIG. 3), control signal Vok remains at a logic high level, thereby maintaining voltage generator 13 (FIG. 13) in a de-activated state. However, when on-chip supply voltage Vbb negatively decrease below the threshold voltage (about −1.3 volts) of VSC 11 (FIG. 3), VSC 11 de-asserts the voltage sense signal at connection 37 to a logic high level. The now logic high level of the voltage sense signal causes NAND gate 51 to generate a logic low output signal, which is propagated to NAND gate 52 through buffer circuit 54. Consequently, NAND gate 52 generates a logic high output signal, which is propagated through buffer circuit 55 to NAND gate 53. As a result, both input leads of NAND gate 53 now receive logic high level signals, thereby causing NAND gate 53 to generate a logic low output signal This logic low output signal is propagated through buffer circuit 56 to serve as control signal Vok. As described above, a logic low level of control signal Vok activates voltage generator 13 (FIG. 3). The cycle is then repeated as described above as on-chip supply voltage Vbb negatively increases due to the operation of voltage generator 13 (FIG. 3).

When the chip is to be placed into the low-power mode, the low-power control signal is set to a logic low level. Consequently, NAND gates 51 and 53 generate logic high output signals. This causes control signal Vok to have a logic high level and, thus, voltage generator 13 (FIG. 3) is de-activated. In embodiments of voltage generator 13 having an oscillator and a pump circuit (described below as an alternative embodiment in conjunction with FIG. 8), the control signal Vok need not be held at a logic high level during the low-power mode as long as the enable signal for the pump circuit is de-asserted. In this type of embodiment, NAND gate 53 may be implemented as a two-input NAND gate without receiving the low-power mode control signal.

Figure 6:
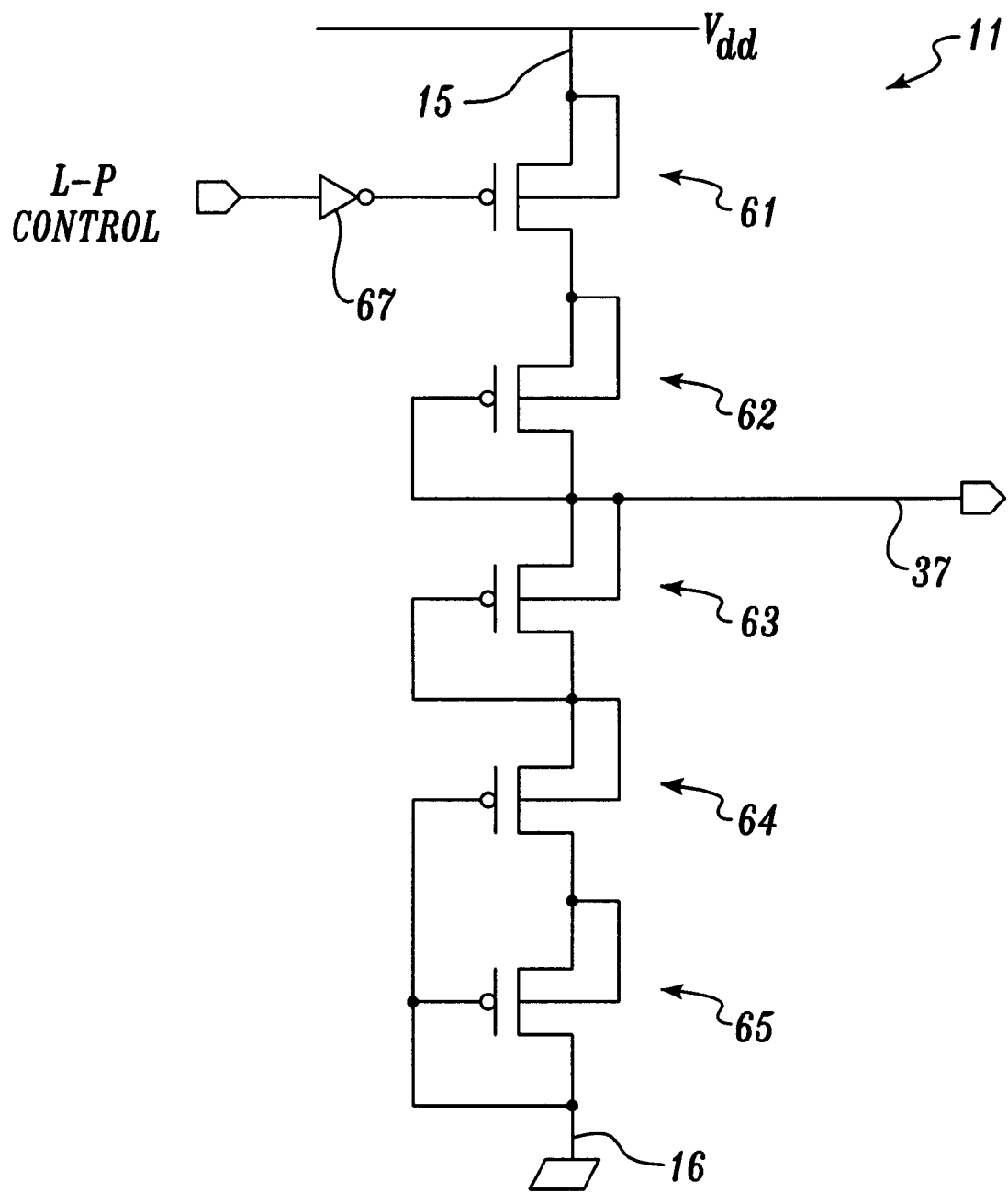
FIG. 6 is a schematic diagram illustrative of a voltage sensing circuit of FIG. 3, according to one embodiment of the present invention.

FIG. 6 is a schematic diagram illustrative of VSC 11 (FIG. 3), according to one embodiment of the present invention. In this embodiment, VSC 11 includes p-channel field effect transistors 61–65 and inverter 67. VSC 11 is interconnected as follows. Transistors 61–65 have their channel regions connected in series, between connections 15 and 16, with inverter 67 connected between the low-power control signal and the gate of transistor 61. More specifically, the output lead of inverter 67 is connected to the gate of transistor 61, with the input lead of inverter 67 is connected to receive the aforementioned low-power control signal. The source of transistor 61 is also connected to connection 15 to receive offchip supply voltage Vdd. The drain of transistor 61 is connected to the source of transistor 62. Transistor 62 is diode-connected, with its drain connected to connection 37 and the source of diode-connected transistor 63. The drain of transistor 63 is connected to the source of transistor 64.

The gate of transistor 64 is connected to the gate of transistor 65, whereas the drain of transistor 64 is connected to the source of transistor 65. Transistor 65 is diode-connected, with its drain connected to receive on-chip supply voltage Vbb through connection 16.

This embodiment of VSC 11 operates as follows. When the low-power control signal is at a logic high level, inverter 67 generates a logic low level output signal, thereby turning transistor 61 on. Diode-connected transistor 62 will be conductive as long as the voltage at node 37 remains at least two threshold voltage drops below off-chip supply voltage Vdd. The channel length of transistor 63 is selected so as to adjust the threshold voltage (i.e., Vt) of transistor 63 so that transistors 63–65 will become conductive only when the on-chip generated voltage Vbb reaches or exceeds the predetermined threshold of VSC 11. In this embodiment, the threshold voltage of transistor 63 is adjusted through spare devices that are coupled to form part of transistor 63 through metal option. Thus, when on-chip supply voltage Vbb reaches the threshold of VSC 11 (i.e., −1.3 volts), transistors 63–65 will all be conductive, thereby pulling down the voltage at connection 37 enough to achieve a logic low level.

VSC 31 is substantially similar to VSC 11, except that the size of transistor 63 is adjusted so as to achieve a VSC 31 threshold of −1.5 volts. In light of the present disclosure, those skilled in the art can, in other embodiments, adjust the sizes of transistors other than or in conjunction with transistor 63 to achieve a desired threshold of VSC 11. Still further, in embodiments that do not use the low-power control signal, inverter 67 may be deleted, with transistor 61 being diode-connected or having its gate connected to receive ground potential.

Figure 7:
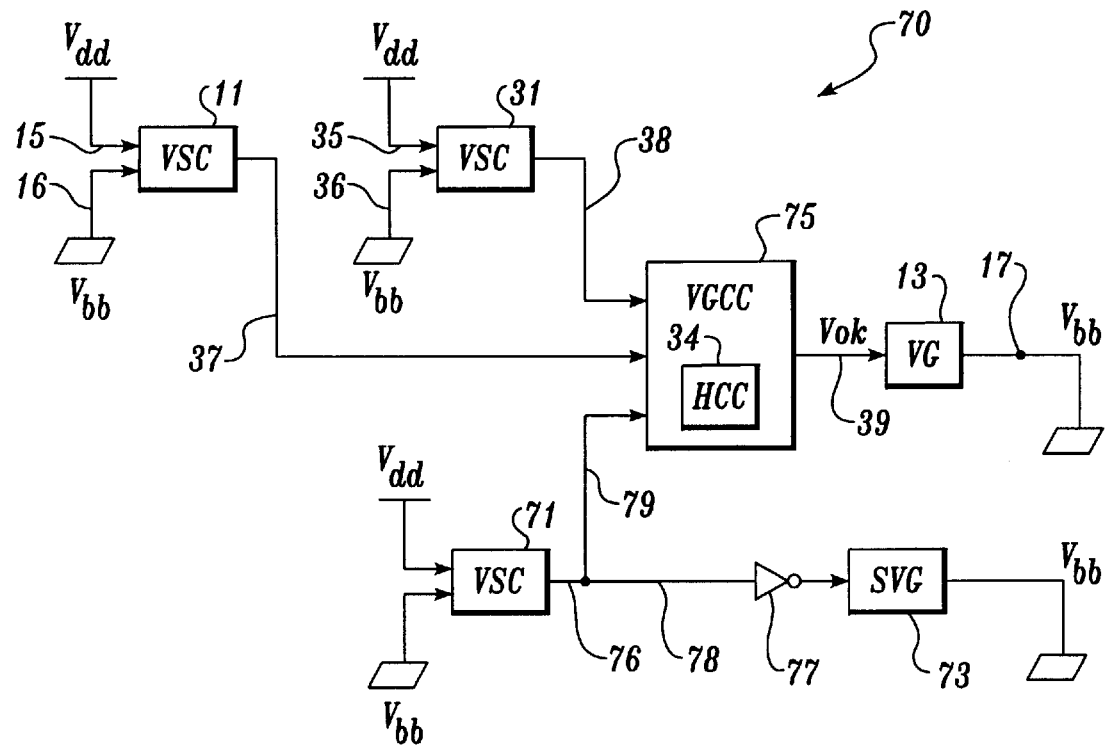
FIG. 7 is a functional block diagram illustrative of another embodiment of a regulator system for an on-chip voltage generator, according to the present invention.

FIG. 7 is a functional block diagram illustrative of a regulator system 70, according to another embodiment of the present invention. System 70 is advantageously used in chips having a stand-by voltage generator that is normally always activated. In this embodiment, system 70 is substantially identical to system 30, except system 70 includes VSC 71 and stand-by voltage generator 73. VSC 71 and stand-by voltage generator 73 are substantially similar to VSC 11 and voltage generator 13 (FIG. 3), except that VSC 71 is configured to have a threshold voltage of about −1.8 volts and stand-by voltage generator 73 is smaller (i.e., generates an output current with a smaller magnitude than voltage generator 13). In addition, VGCC 33 (FIG. 3) is modified into a VGCC 75 to receive a third voltage sense signal from VSC 71. In particular, VSC 71 and VGCC 75 are configured to clamp on-chip supply voltage at a maximum negative value of about −1.8 volts.

System 70 operates substantially as described above for system 30 (FIG. 3) except as follows. Because VSC 71 is preset with a threshold voltage of −1.8 volts, VSC 71 generates a voltage sense signal on a connection 76 with a logic high level for normal values of on-chip supply voltage Vbb. This logic high voltage sense signal is received by an inverter 77 and VGCC 75 through connections 78 and 79, respectively. Inverter 77 then outputs a logic low signal to stand-by voltage generator 73, thereby activating stand-by voltage generator 73 to negatively increase on-chip supply voltage Vbb. For values of on-chip supply voltage Vbb below the threshold voltage of VSC 71, VGCC 75 operates to generate control signal Vok as described above for VGCC 33 (FIG. 3).

Ideally, through the operation of system 70, on-chip supply voltage Vbb stays within the threshold voltages of VSCs 11 and 31. However, if on-chip supply voltage Vbb negatively exceeds the threshold voltage of VSC 71 (e.g., in a low-power mode stand-by voltage generator 73 may be able to provide charge to the substrate faster than the charge is leaked), VSC 71 asserts the active-low voltage sense signal at connection 76. Of course, the on-chip voltage Vbb may exceed the threshold voltage of VSC 71 due to malfunction or noise. Through connection 79, VGCC 75 receives the logic low voltage sense signal and, in response, forces control signal Vok to a logic high level. In addition, through connection 78, inverter 77 also receives the logic low voltage sense signal. In response, inverter 77 generates a logic high output signal, thereby de-activating stand-by voltage generator 73. As a result, this feature helps ensure that voltage generators 13 and 73 are de-activated when on-chip supply voltage Vbb negatively exceeds the threshold voltage (i.e., −1.8 volts) of VSC 71.

Figure 8:
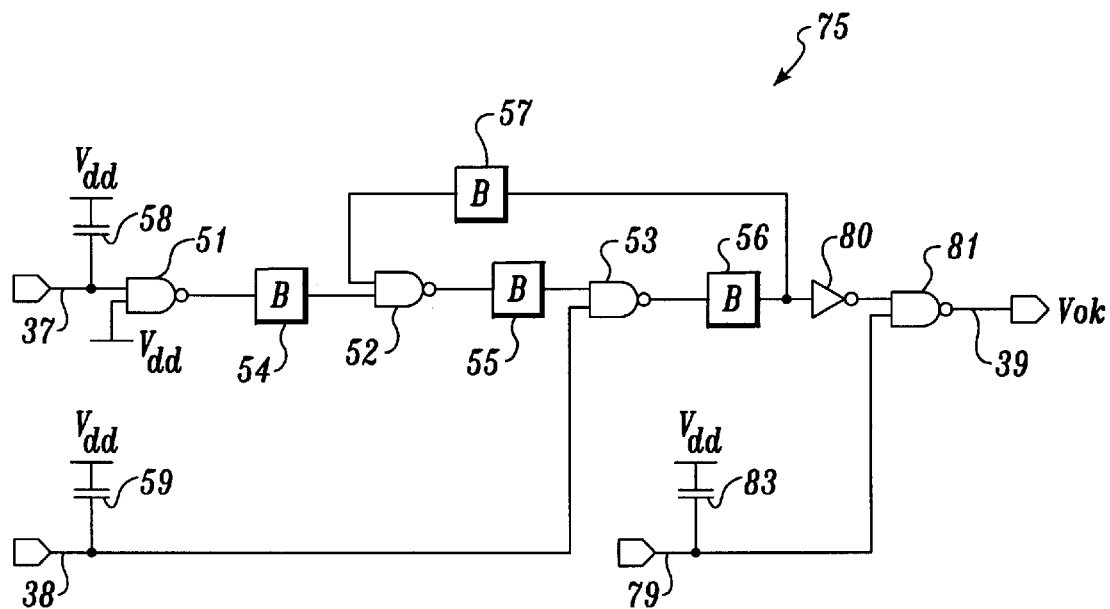
FIG. 8 is a schematic diagram of an implementation of the voltage generator control circuit of FIG. 7, according to one embodiment of the present invention.

FIG. 8 is a schematic diagram illustrative of VGCC 75 (FIG. 7), according to one embodiment of the present invention. This embodiment of VGCC 75 is substantially similar to VGCC 33 (FIG. 5), except that VGCC 75 includes an inverter 80 and a two-input NAND gate 81 connected between the output lead of buffer circuit 56 and connection 39. In particular, the input and output leads of inverter 80 are respectively connected to the output lead of buffer circuit 56 and to one of the input leads of NAND gate 81. The other input lead of NAND gate 81 is connected to connection 79. Thus, the output signal generated by NAND gate 81 serves as control signal Vok.

In addition, VGCC 75 includes a capacitor 83 connected between a source of off-chip supply voltage Vdd and connection 79. Capacitor 83 adds some delay to transitions of the voltage sense signal generated by VSC 71 (FIG. 7) and helps ensure that this voltage sense signal initializes with a logic high level.

This embodiment of VGCC 75 operates as follows. When on-chip supply voltage Vbb is less negative than the threshold voltage (i.e., −1.8 volts) of VSC 71 (FIG. 7), VSC 71 causes a logic high level to be present at connection 79. As a result, NAND gate 81 fluctions essentially as an inverter. Thus, as long as the voltage sense signal generated by VSC 71 (FIG. 7) is at a logic high level (i.e., when on-chip supply voltage Vbb is negatively below −1.8 volts), the two inversions provided by inverter 80 and NAND gate 81 operate to propagate the output signal from buffer circuit 56 to connection 39. Accordingly, in this case VGCC 75 operates in essentially the same manner as described above in conjunction with FIG. 5 for VGCC 33. In an alternative embodiment, buffer circuit 56 can be deleted because of the added delay provided by inverter 80 and NAND gate 81.

However, if on-chip supply voltage Vbb reaches −1.8 volts, VSC 71 (FIG. 7) causes the voltage sense signal at connection 79 to transition to a logic low level, thereby causing NAND gate 81 to generate control signal Vok with a logic high level. As described above, this logic high level de-activates voltage generator 13 (FIG. 3). As a result, NAND gate 81 forces control signal Vok to be at a logic high level no matter what signal is received from buffer circuit 56.

In an alternative embodiment, voltage generator 13 is implemented with an oscillator and a pump circuit (not shown). Control signal Vok serves as an enable signal for the oscillator, while the output signal of VSC 73 serves as an enable signal for the pump circuit. Thus, in this embodiment, inverter 80 and NAND gate 81 are deleted, with connection 78 (FIG. 7) being connected directly to the pump circuit of voltage generator 13.

The embodiments of the voltage regulator system described above are illustrative of the principles of the present invention and are not intended to limit the invention to the particular embodiments described. For example, in light of the present disclosure, those skilled in the art of voltage regulator circuits can devise other implementations for use with on-chip voltage generators that generate positive voltage. In addition, different types of voltage generators other than the charge pumps described can be used in other embodiments. Still further, those skilled in the art can implement VGCC 31 with different but equivalent (in overall finction) logic circuits than those described herein. Accordingly, while the preferred embodiment of the invention has been illustrated and described, it will be appreciated that various changes can be made therein without departing from the spirit and scope of the invention.

We claim:

1. A circuit for activating an on-chip voltage generator, the on-chip voltage generator configured to generate an on-chip supply voltage, the circuit comprising:

a first voltage sense circuit configured to monitor the on-chip supply voltage, wherein the first voltage sense circuit is configured to detect an occurrence of the on-chip supply voltage being substantially equal to a first threshold;

a second voltage sense circuit configured to monitor the on-chip supply voltage, wherein the second voltage sense circuit is configured to detect an occurrence of the on-chip supply voltage being substantially equal to a second threshold, the second threshold having a value different from the value of the first threshold; and a logic circuit coupled to the on-chip voltage generator and the first and second voltage sense circuits, wherein the logic circuit is configured to selectively activate and de-activate the on-chip voltage generator so as to maintain the on-chip supply voltage within a range defined by the first and second thresholds so that in normal operation all transitions between activation and de-activation of the on-chip voltage generator are in response to a detection of an occurrence of the first or second threshold, wherein said all transitions occur between the detections of said first and second thresholds.

2. The circuit of claim 1 wherein the logic circuit is configured so that the logic circuit de-activates the on-chip voltage generator in response to the second voltage sense circuit detecting that the on-chip supply voltage is substantially equal to the second threshold.

3. The circuit of claim 1 wherein the logic circuit is configured so that the logic circuit activates the on-chip voltage generator in response to the first voltage sense circuit detecting that the on-chip supply voltage is substantially equal to the first threshold.

4. A circuit for activating an on-chip voltage generator, the on-chip voltage generator configured to generate an on-chip supply voltage, the circuit comprising:

a first voltage sense circuit configured to monitor the on-chip supply voltage, wherein the first voltage sense circuit is configured to detect an occurrence of the on-chip supply voltage being substantially equal to a first threshold:

a second voltage sense circuit configured to monitor the on-chip supply voltage wherein the second voltage sense circuit is configured to detect an occurrence of the on-chip supply voltage being substantially equal to a second threshold, the second threshold having a value different from the value of the first threshold; and a logic circuit coupled to the on-chip voltage generator and the first and second voltage sense circuits, wherein the logic circuit is configured to selectively activate and de-activate the on-chip voltage generator so as to maintain the on-chip supply voltage within a range defined bv the first and second thresholds, wherein the logic circuit comprises:

a first logic gate coupled to the first voltage sense circuit;

a second NAND gate coupled to the first logic gate and the on-chip voltage generator; and a third NAND gate coupled to the on-chip voltage generator, the second NAND gate and the second voltage sense circuit.

5. The circuit of claim 4 wherein the logic circuit further comprises:

a first buffer circuit coupling the second NAND gate to the first logic gate;

a second buffer circuit coupling third NAND gate to the second NAND gate;

a third buffer circuit coupling the third NAND gate to the on-chip voltage generator; and a fourth buffer circuit coupling the third buffer circuit to the second NAND gate.

6. The circuit of claim 4 wherein the first logic gate comprises an inverter.

7. The circuit of claim 4 wherein the first logic gate comprises a first NAND gate having an input lead coupled to receive a low-power mode control signal.

8. The circuit of claim 4 wherein the third NAND gate is coupled to receive a low-power mode control signal.

9. A circuit for activating an on-chip voltage generator, the on-chip voltage generator configured to generate an on-chip supply voltage, the circuit comprising:

a first voltage sense circuit configured to monitor the on-chip supply voltage, wherein the first voltage sense circuit is configured to detect an occurrence of the on-chip supply voltage being substantially equal to a first threshold:

a second voltage sense circuit configured to monitor the on-chip supply voltage, wherein the second voltage sense circuit is configured to detect an occurrence of the on-chip supply voltage being substantially equal to a second threshold, the second threshold having a value different from the value of the first threshold;

a logic circuit coupled to the on-chip voltage generator and the first and second voltage sense circuits, wherein the logic circuit is configured to selectively activate and de-activate the on-chip voltage generator so as to maintain the on-chip supply voltage within a range defined by the first and second thresholds; and a third voltage sense circuit coupled to the logic circuit, wherein the third voltage sense circuit is configured to monitor the on-chip supply voltage and detect an occurrence of the on-chip supply voltage being substantially equal to a third threshold, the third threshold having a value outside of the range defined by the first and second thresholds.

10. The circuit of claim 9 wherein the logic circuit is further configured to de-activate the on-chip voltage generator in response to the third voltage sense circuit detecting that the on-chip supply voltage is substantially equal to the third threshold.

11. The circuit of claim 9 wherein the third voltage sense circuit is further configured to de-activate a second on-chip voltage generator in response to detecting that the on-chip supply voltage is substantially equal to the third voltage.

12. The circuit of claim 1 wherein the on-chip supply voltage is negative.

13. The circuit of claim 1 wherein the on-chip supply voltage is used to bias a substrate of an integrated circuit die.

14. A circuit for activating an on-chip voltage generator, the on-chip voltage generator configured to generate an on-chip supply voltage, the circuit comprising:

a first voltage sense circuit configured to monitor the on-chip supplv voltage, wherein the first voltage sense circuit is configured to detect an occurrence of the on-chip supply voltage being substantially equal to a first threshold;

a second voltage sense circuit configured to monitor the on-chip suppl voltage, wherein the second voltage sense circuit is configured to detect an occurrence of the on-chip supply voltage being substantially equal to a second threshold, the second threshold having a value different from the value of the first threshold; and a logic circuit coupled to the on-chip voltage generator and the first and second voltage sense circuits, wherein the logic circuit is configured to selectively activate and de-activate the on-chip voltage generator so as to maintain the on-chip supply voltage within a range defined by the first and second thresholds, wherein the first voltage sense circuit comprises:
an output lead coupled to the logic circuit;
a first transistor having a first node, a second node and a third node, the first node of the first transistor being coupled to a source of a second voltage;
a second transistor having a first node, a second node and a third node, the first node of the second transistor being coupled to the third node of the first transistor, and the second and third nodes of the second transistor being coupled to the output lead;
a third transistor having a first node, a second node and a third node, the first node of the third transistor being coupled to the output lead, and the second and third nodes of the third transistor being coupled together;
a fourth transistor having a first node, a second node and a third node, the first node of the fourth transistor being coupled to the third node of the third transistor, and the second node of the fourth transistor being coupled to the on-chip supply voltage; and
a fifth transistor having a first node, a second node and a third node, the first node of the fifth transistor being coupled to the third node of the fourth transistor, the second and third nodes of the fifth transistor being coupled to the on-chip supply voltage.

15. The circuit of claim 14 wherein the first voltage sense circuit further comprises an inverter having an input lead coupled to receive a low-power control signal and having an output lead coupled to the second node of the first transistor.

16. The circuit of claim 14 wherein the second node of the first transistor of the first voltage sense circuit is configured to receive a logic low level voltage when the chip is powered on.

17. A circuit for activating an on-chip voltage generator, the on-chip voltage generator configured to generate an on-chip supply voltage, the circuit comprising:
a first voltage sense circuit configured to monitor the on-chip supply voltage, wherein the first voltage sense circuit is configured to detect an occurrence of the on-chip supply voltage being substantially equal to a first threshold;
a second voltage sense circuit configured to monitor the on-chip supply voltage, wherein the second voltage sense circuit is configured to detect an occurrence of the on-chip supply voltage being substantially equal to a second threshold, the second threshold having a value different from the value of the first threshold; and
control means, coupled to the on-chip voltage generator and the first and second voltage sense circuits, for selectively activating and de-activating the on-chip voltage generator so as to maintain the on-chip supply voltage within a range defined by the first and second thresholds so that in normal operation all transitions between activation and de-activation of the on-chip voltage generator are in response to a detection of an occurrence of the first or second threshold, wherein said all transitions occur between the detections of said first and second thresholds.

18. The circuit of claim 17 wherein the control means is configured so that the control means de-activates the on-chip voltage generator in response to the second voltage sense circuit detecting that the on-chip supply voltage is substantially equal to the second threshold.

19. The circuit of claim 17 wherein the control means is configured so that the control means activates the on-chip voltage generator in response to the first voltage sense circuit detecting that the on-chip supply voltage is substantially equal to the first threshold.

20. A circuit for activating an on-chip voltage generator, the on-chip voltage generator configured to generate an on-chip supply voltage, the circuit comprising:
a first voltage sense circuit configured to monitor the on-chip supply voltage, wherein the first voltage sense circuit is configured to detect an occurrence of the on-chip supply voltage being substantially equal to a first threshold;
a second voltage sense circuit configured to monitor the on-chip supply voltage, wherein the second voltage sense circuit is configured to detect an occurrence of the on-chip supplv voltage being substantially equal to a second threshold, the second threshold having a value different from the value of the first threshold;
control means, coupled to the on-chip voltage generator and the first and second voltage sense circuits, for selectively activating and de-activating the on-chip voltage generator so as to maintain the on-chip supply voltage within a range defined by the first and second thresholds; and
a third voltage sense circuit coupled to the control means, wherein the third voltage sense circuit is configured to monitor the on-chip supply voltage and detect an occurrence of the on-chip supply voltage being substantially equal to a third threshold, the third threshold having a value outside of the range defined by the first and second thresholds.

21. The circuit of claim 20 wherein the control means is further configured to de-activate the on-chip voltage generator in response to the third voltage sense circuit detecting that the on-chip supply voltage is substantially equal to the third threshold.

22. The circuit of claim 20 wherein the third voltage sense circuit is further configured to de-activate a second on-chip voltage generator in response to detecting that the on-chip supply voltage is substantially equal to the third voltage.

23. A circuit for activating an on-chip voltage generator the on-chip voltage generator configured to generate an on-chip supply voltage, the circuit comprising
a first voltage sense circuit configured to monitor the on-chip supply voltage, wherein the first voltage sense circuit is configured to detect an occurrence of the on-chip supply voltage being substantially equal to a first threshold;
a second voltage sense circuit configured to monitor the on-chip supply voltage, wherein the second voltage sense circuit is configured to detect an occurrence of the on-chip supply voltage being substantially equal to a second threshold, the second threshold having a value different from the value of the first threshold; and control means, coupled to the on-chip voltage generator and the first and second voltage sense circuits, for selectively activating and de-activating the on-chip voltage generator so as to maintain the on-chip supply voltage within a range defined by the first and second thresholds, wherein the first voltage sense circuit comprises:
an output lead coupled to the control means;
a first transistor having a first node, a second node and a third node, the first node of the first transistor being coupled to a source of a second voltage;
a second transistor having a first node, a second node and a third node, the first node of the second transistor being coupled to the third node of the first transistor, and the second and third nodes of the second transistor being coupled to the output lead;
a third transistor having a first node, a second node and a third node, the first node of the third transistor being coupled to the output lead, and the second and third nodes of the third transistor being coupled together;
fourth transistor having a first node, a second node and a third node, the first node of the fourth transistor being coupled to the third node of the third transistor, and the second node of the fourth transistor being coupled to the on-chip supply voltage; and
a fifth transistor having a first node, a second node and a third node, the first node of the fifth transistor being coupled to the third node of the fourth transistor, the second and third nodes of the fifth transistor being coupled to the on-chip supply voltage.

24. The circuit of claim 23 wherein the second node of the first transistor is configured to receive a logic low level signal when the circuit is operating in a normal power mode.

25. The circuit of claim 24 wherein the second node of the first transistor is configured to receive a logic high level signal when the circuit is operating in a low-power mode.

26. The circuit of claim 23 wherein the first, second, third, fourth and fifth transistors are pchannel field effect transistors.

27. A method controlling the activation of an on-chip voltage generator, the on-chip voltage generator configured to generate an on-chip supply voltage, the method comprising:

monitoring the on-chip supply voltage to detect an occurrence of the on-chip supply voltage being substantially equal to a first threshold;

monitoring the on-chip supply voltage to detect an occurrence of the on-chip supply voltage being substantially equal to a second threshold, the second threshold having a value different from the value of the first threshold; and selectively activating and de-activating the on-chip voltage generator so as to maintain the on-chip supply voltage within a range defined by the first and second thresholds so that in normal operation all transitions between activation and de-activation of the on-chip voltage generator are in response to a detection of an occurrence of the first or second threshold, wherein said all transitions occur between the detections of said first and second thresholds.

28. The method of claim 27 wherein selectively activating and de-activating comprises de-activating the on-chip voltage generator in response to detecting that the on-chip supply voltage is substantially equal to the second threshold.

29. The method of claim 28 wherein selectively activating and de-activating further comprises activating the on-chip voltage generator in response to detecting that the on-chip supply voltage is substantially equal to the first threshold.

* * * * *